United States Patent [19]

Metcalf et al.

[11] 4,210,455
[45] Jul. 1, 1980

[54] RETARDED AQUEOUS HYDRAULIC CEMENT SLURRY

[75] Inventors: Arthur S. Metcalf, Tulsa; Louis H. Eilers, Inola, both of Okla.

[73] Assignee: The Dow Chemical Company, Midland, Mich.

[21] Appl. No.: 955,681

[22] Filed: Oct. 30, 1978

[51] Int. Cl.$^2$ .............................................. C04B 7/35
[52] U.S. Cl. ....................... 106/90; 106/315; 166/293
[58] Field of Search ................... 106/90, 315; 166/293

[56] References Cited

U.S. PATENT DOCUMENTS

| | | | |
|---|---|---|---|
| 3,053,673 | 9/1962 | Walker | 106/315 |
| 3,491,049 | 1/1970 | Gibson et al. | 106/90 |
| 3,856,541 | 12/1974 | Martin | 106/315 |

*Primary Examiner*—James Poer

[57] ABSTRACT

A retarded aqueous hydraulic cement slurry is provided containing, in addition to water and a hydraulic cement, a retarder selected from the group consisting of: (a) alkaline earth metal salts of mono- and di-carboxylic acid derivatives of simple sugars, (b) alkaline earth metal salts of borate esters of mono- and di-carboxylic acid derivatives of simple sugars, and (c) mixtures of any two or more of the foregoing. Unexpectedly, the retarder of the present invention is compatible with polyamine type fluid loss agents and with certain thixotropic cements. Also, the retarder is sufficiently water soluble so that it can be prepared as a liquid additive, thereby simplifying mixing procedures in remote locations such as offshore well platforms.

17 Claims, No Drawings

RETARDED AQUEOUS HYDRAULIC CEMENT SLURRY

BACKGROUND OF THE INVENTION

A. Field of the Invention

The invention relates to a hydraulic cement slurry, to a dimensionally stable solid formed when the slurry sets, and to a method for cementing wells using the slurry. A key feature of all aspects of the invention is a particular set retarder component in the slurry.

B. Description of the Prior Art

Hydraulic cements, i.e., any inorganic cement that hardens or sets under water, are customarily admixed with water and emplaced as aqueous slurries. The amount of water employed may vary rather extensively dependent largely upon the fluidity of the slurry required and upon the necessary ultimate strength. Various functional additives may be employed to modify the properties of the basic cement slurry.

In cementing operations, particularly in moderate and high temperature environments such as may be encountered in well cementing, for example, it is often necessary, or at least highly desirable, to retard the rate at which a cement slurry would normally set in order to provide an adequate thickening time to permit placement of the cement slurry where desired. Martin, U.S. Pat. No. 3,100,526, teaches glucoheptonic acid or a water-soluble salt thereof, preferably sodium glucoheptonate, as a retarder. Walker, U.S. Pat. No. 3,053,673, teaches a two component retarder system comprising a lignin derivative, i.e., a lignosulfonic acid salt, and either gluconic acid, gluconic acid delta lactone, or an alkali metal, ammonium, or alkaline earth metal gluconate.

Another class of functional additives for cement slurries is a fluid loss control additive. In a great many uses of a hydraulic cement it is necessary for the cement slurry to be emplaced within or next to a porous medium, for example, earthen strata, e.g., in the cementing off of boreholes, grouting, dam and tunnel construction and the like. When such is the case, water filters out of the slurry and into the strata during the setting period. When this occurs to any appreciable extent there usually results an uncontrolled setting rate, improper placement, impaired strength properties and usually a contamination of the surrounding strata. All of these undesirable conditions are especially to be avoided in cementing operations associated with oil, gas, water or brine wells. In an effort to lessen the loss of fluid from an aqueous hydraulic cement slurry various materials have been employed. One such material comprises a polyamine compound selected from the class consisting of polyalkyleneimines, polyalkylenepolyamines and mixtures thereof. A description of these polyamine compounds and their use in hydraulic cement slurries is taught, for example, by Gibson et al., U.S. Pat. No. 3,491,049, the teachings of which are specifically incorporated herein by reference.

It is often desirable to include additives both to reduce fluid loss from a slurry and to retard the rate of set of the slurry. Martin, U.S. Pat. No. 3,234,154 teaches to employ glucoheptonic acid or a water-soluble salt thereof as a retarder in combination with sulfonated polystyrene or sulfonated polyvinyltoluene as a fluid loss additive and a lignin derivative as a stabilizer. Martin, U.S. Pat. No. 3,662,830, teaches a two component borate and alkali or alkaline earth metal salt of lignosulfonic acid retarder may be used in combination with cellulose derivatives, sulfonated polystyrene or sulfonated polyvinyltoluene. In a commonly assigned U.S. patent application by Crinkelmeyer et al., allowed Ser. No. 824,022 filed Aug. 12, 1977 (a continuation-in-part of Ser. No. 546,845 filed Feb. 3, 1975, now abandoned), a retarded low fluid loss cement slurry is taught containing a lignoamine or lignosulfonate, a borate, a polyamino compound, and a carbonate or bicarbonate.

Notwithstanding the foregoing, however, those skilled in the art (e.g., see Martin, U.S. Pat. No. 3,234,154 at column 1, lines 45–52), recognize that an additive which performs well alone may not be compatible in the presence of other additives. Thus, as is shown in the comparison runs below, sodium glucoheptonate cannot be used to retard slurries such as those taught by Gibson et al., containing a polyamine compound as a fluid loss additive because the sodium glucoheptonate severely adversely affects the fluid loss properties of the slurry.

Another factor to be considered, especially in offshore cementing operations, is logistics. Since offshore platforms normally do not have equipment for dry blending dry additives with the neat cement, it is highly desirable to assure a uniform slurry that all components of a cement slurry except the neat cement be substantially water-soluble so that the additives may be readily and accurately metered into the mix water just prior to the on-the-fly addition of the neat cement. It is also highly desirable, especially for offshore work, to have a system which can utilize mild brines or sea water as the mix water.

Thus, one particular problem addressed by the present invention was that of providing a retarder adapted for offshore use which was compatible with a cement system such as that of Gibson et al., i.e., which contains a polyamino compound as a fluid loss additive; which was a liquid or liquifiable; and which resulted in a system that could employ fresh water or sea water as the mix water.

The teachings of each of the patents and the patent application hereinabove referred to are expressly incorporated herein.

SUMMARY OF THE INVENTION

Notwithstanding the fact that certain water-soluble sugar acids and salts thereof were generically taught to have utility as retarders, the present invention is based in part on the surprising discovery that the alkaline earth metal salts of sugar acids do not suffer from severe compatibility problems frequently encountered with the corresponding free acids or alkali metal salts. For example, a hydraulic cement slurry is provided according to the present invention comprising a hydraulic cement, sufficient water to form a pumpable slurry which will cure to a dimensionally stable solid, and effective amounts of: a polyamino fluid loss additive selected from the group consisting of polyalkyleneimines, polyalkylenepolyamines and mixtures thereof; a dispersant; and dissolved in the water, a retarder selected from the group consisting of (a) alkaline earth metal salts of mono- and di-carboxylic acid derivatives of simple sugars, (b) alkaline earth metal salts of borate esters of mono- and di-carboxylic acid derivatives of simple sugars, and (c) mixtures of any of the foregoing.

Of the art discussed above, Martin, U.S. Pat. No. 3,100,526 teaches and claims use of "glucoheptonic acid and [water] soluble salts thereof" as a retarder, but only Walker, U.S. Pat. No. 3,053,673, specifically teaches alkaline earth metal gluconates and only then in combination with a lignin derivative. It has now also been discovered that use of a lignin derivative is not essential when using an alkaline earth metal salt of a sugar acid as a retarder. Thus, another aspect of the present invention is a hydraulic cement slurry comprising a hydraulic cement, sufficient water to form a pumpable slurry which will cure to a dimensionally stable solid, and an effective amount of a retarder selected from the group consisting of (a) alkaline earth metal salts of mono- and di-carboxylic acid derivatives of simple sugars, and (c) mixtures of any of the foregoing, said slurry being substantially free of lignin derivatives. Unexpectedly, such a slurry is compatible with polyamino type fluid loss additives, and other materials can be included in such a slurry to render it thixotropic.

Other aspects of the invention are the dimensionally stable solid which results upon curing of the slurry of the present invention, and a method of cementing a conduit in a borehole penetrating a subterranean formation comprising providing a slurry according to the present invention, emplacing the slurry in at least a portion of the annulus between the conduit, i.e., casing, tubing, or the like, and the wall of the borehole. Yet another aspect of the invention comprises using the slurry of the present invention in a squeeze cementing or grouting application, i.e., wherein the slurry is injected into voids in a subterranean formation and permitted to cure therein, thereby plugging the voids.

Still another aspect of the invention is a method of cementing a well with a retarded, low fluid loss slurry which, except for the neat cement, consists of water and water-soluble components, where the method comprises: providing a concentrated aqueous solution of at least one water-soluble fluid loss additive; providing a concentrated aqueous solution of at least one water-soluble retarder; providing a source of a suitable mix water, e.g., fresh water, brine, or sea water; adding an effective amount of each of the concentrates to the mix water; pumping the mix water and liquid additives through a conduit which is connected with the well and having means, such as so called jet mixer or a Tornado brand mixer as disclosed in U.S. Pat. Nos. 3,201,093, or 3,741,553, for continuously admixing a dry particulate with the water; continuously adding an appropriate amount of neat cement to the mix water, thereby forming a pumpable slurry; and injecting the pumpable slurry into the well. Depending on the well location and the availability of a body of water, a continuous flow of the mix water may be provided, e.g., as by pumping water directly from the sea, and the liquid concentrates continuously metered into the mix water stream.

FURTHER DESCRIPTION OF THE INVENTION

As used herein, "BWOC" denotes by weight of cement and "BWOW" denotes by weight of water.

Hydraulic cement as employed herein is any inorganic cement that hardens or sets under water. Hydraulic cements which can be employed herein include, for example, portland, aluminous and pozzolan cement, including cements wherein minor amounts of other oxides, e.g., iron oxide, are also present. Because of its superior strength portland cements are usually preferred. However, certain advantages are often gained by the use of other hydraulic cements in admixture with portland cement. As employed herein the term "hydraulic cements" includes minor amounts of extenders such as bentonite, gilsonite and includes such cements used either without any appreciable sand or aggregate material (such cement usually being referred to as neat cement) or such cements in admixture with a granular filling material and/or aggregate, including sand, ground limestone, pebbles and the like. Strength enhancers such as silica flour can also be employed.

The alkaline earth metal salts of the acid derivatives of simple sugars include, for example, the magnesium, calcium, barium, and strontium salts of glucoheptonic acid, of gluconic acid, of galactonic acid, of xylonic acid, of mucic acid, of saccharide acid, and similar simple sugar acids. Preferably, the simple sugar component has from 5 to 7 carbon atoms, inclusive. Such acids are readily available commercially, or may be prepared by oxidation of any one of the corresponding sugars. See for example, Volume 4, page 138, of *Kirk-Othmer Encyclopedia of Chemical Technology*, 2nd edition. Many of the alkaline earth metal salts are also available commercially, or they may be prepared simply by dissolving the free acid or an alkali metal or ammonium salt thereof in water along with an approximately stoichiometric amount of an alkaline earth metal ion source such as an alkaline earth metal halide, acetate, nitrate, or the like. The alkaline earth metal salts of the borate esters of the simple sugars may similarly be obtained by dissolving, for example, an alkali metal salt of the ester in water with an alkaline earth metal ion source. Alternatively, boric acid, borax, or other water soluble borate ion source may be added to the corresponding sugar acid salt. In the present invention, the salt may be formed in situ in solution, e.g., an additive solution of water to which has been added sodium glucoheptonate and a stoichiometric amount of calcium chloride is the functional equivalent of an additive solution of water to which has been added crystalline calcium glucoheptonate.

Where it is desired to add the retarder to the cement system as a liquid additive, it is preferable that the retarder be selected from those members of the class which are sufficiently soluble in water to prepare a concentrate which is reasonably economical to transport and which is stable under a variety of conditions to which containers of concentrate might be exposed during storage and transport. Thus, the retarder is preferably selected from those which are soluble in water in an amount sufficient to lower the freezing point of the concentrate to about 20° F. (−6.7° C.), and for economy of transport and storage, the retarder is preferably soluble in water in an amount of at least 10 percent BWOW at said temperature. The alkaline earth metal salts of glucoheptonic acid are particularly preferred, especially the calcium, strontium, and barium salts. Most preferred is calcium glucoheptonate. Small but effective amounts of other additives which do not interfere with performance of the retarder may also be included, e.g., a bactericide, fungicide, and/or dye aid in the storage and safe handling of the additive concentrate.

Sodium glucoheptonate is available as a aqueous solution which may readily be converted to the calcium salt. High purity grades may contain substantially the alpha form of sodium glucoheptonate, although the crude product containing mixtures of the alpha and beta forms may also be employed. Crude solutions may even be preferable economically, and also because concentrated solutions of crude calcium glucoheptonate tend to be less prone to solidify upon seeding with a calcium glucoheptonate crystal than are more pure solutions.

The exact amount of each constituent and ratio of constituents to each other can vary within a wide range depending on the hydraulic cement employed. It is well known in this art that the characteristics of cement may vary even with different lots of the same type of cement obtained from the same supplier. It is not known why various cements cause these differences. Therefore, specific preferred ranges should be determined for each batch of hydraulic cement intended to be employed in a cementing operation. Various standardized testing procedures such as those developed and reported by the American Petroleum Institute under various API RP titles can be employed to determine the most preferred parameter for each batch of hydraulic cement.

The amount of the retarder employed will depend somewhat on the particular retarder, on the other components employed in the slurry, on the temperature to which the slurry is to be exposed, and the desired thickening time. Thus, those skilled in the art will be able to determine an optimum quantity with some minor experimentation. Generally, however, a thickening time of from about 3 to about 6 hours at about 175° F. to about 325° F. may be obtained using from about 0.1 to about 2 percent BWOC, preferably about 0.2 to about 0.6 percent BWOC. If temperatures of from about 325° to about 375° F. are expected, use of one of the borate ester retarders is preferred, e.g., calcium boroglucoheptonate.

The mix water employed for the slurry may be fresh water, or a brackish water such as a dilute (less than about 5% total dissolved solids) lease brine or sea water. In using brines or sea water, the alkaline earth metal cation content of the mix water may be considered for purposes of calculating whether additional alkaline earth metal ions are necessary to convert the free acid, alkali metal or ammonium form of the sugar acid to the alkaline earth metal form. However, although a variation from a precise stoichiometric amount of alkaline earth metal ion may slightly reduce the thickening time of the slurry, a fairly large variation can be tolerated— e.g., from about 0.9 to more than 10 equivalents—without drastically changing the slurry properties. The amount of water employed may likewise vary considerably depending on the particular properties desired. Thus, depending on the particular slurry, a range of about 25-100 percent BWOC may be employed. For most purposes, a range of about 35-75 percent water BWOC is preferred. In one embodiment wherein the retarder is employed in combination with a polyamino fluid loss additive, from about 35-55 percent water BWOC is most preferred, whereas with a thixotropic slurry, from about 60-75 percent is most preferred.

In one embodiment of the invention, the slurry may also contain a fluid loss agent of the type disclosed by Gibson et al., i.e., a compound selected from the group consisting of polyalkyleneimines, polyalkylenepolyamines and mixtures thereof, in combination with a dispersant. When so employed, the polyamino compound is generally employed in amounts from about 0.05 to about 8 percent BWOC, more commonly from about 0.1 to about 5 percent BWOC, and most preferably from about 0.5 to about 2 percent, although once again, the optimum amount will depend somewhat on such factors as the other components in the slurry, the source of cement, the permeability of the formation, the average molecular weight of the polymer, and the like.

The polyamino compound employed in the practice of one embodiment of the present invention should have an average molecular weight of at least about 400, and preferably at least 1400. Larger average molecular weights, however, are more preferred, e.g., ranging from about 60,000 to 100,000 or even higher. The polyamino compound employed in the practice of the present invention may be prepared according to any one of a number of known procedures. Specific methods for preparing the polyamino compounds are taught at column 2, line 67 through column 4, line 30 of U.S. Pat. No. 3,491,049, these teachings being specifically incorporated herein by reference. Polyethyleneimine is considered the best mode of this embodiment, although polyalkylenepolyamine still bottoms may also be employed with substantially equivalent performance.

When employing a polyamino fluid loss additive, a dispersant, e.g., an anionic surface active agent, is also employed, preferably in an amount of from about 0.1 to about 2.5 percent BWOC. A number of dispersants are acceptable for the practice of this embodiment of the invention, but sulfonated naphthalene, sulfonated polymelamine, and the like are preferred. Most preferred is Lomar D brand condensed naphthalene sulfonate.

The following observations will further assist those skilled in the art in selecting the optimum system depending on the particular problem at hand. When employed in combination with a polyamino fluid loss additive, an alkaline earth metal boroglucoheptonate (or equivalently, a solution of borax or boric acid, an alkaline earth metal salt, and an alkali metal glucoheptonate or glucoheptonic acid) is recommended at temperatures above 325° F. because of superior performance as a retarder, although perhaps not quite as good fluid loss control is realized with the boroglucoheptonate. Of the boroglucoheptonates, the strontium and barium salts are somewhat poorer as retarders but give better fluid loss control with the polyamino compound. Also, the boroglucoheptonates are less pressure sensitive than the glucoheptonates. For example, after 24 hours at 3000 psi, the compressive strength of cubes containing calcium glucoheptonate is significantly less than when a similar sample is cured at a higher pressure, e.g., 13,000 psi or greater. As a practical matter, however, this is not a serious drawback to use of the calcium glucoheptonate since most well cementing work under conditions where this retarder would be used is done at pressures sufficiently high to develop sufficient early strength at a commercially acceptable rate. Performance of the calcium boroglucoheptonate is about the same regardless of whether fresh or sea water is employed as the slurry mix water, whereas calcium glucoheptonate gives about a 10-20% shorter thickening time when used with salt water than when used with fresh water.

In another embodiment, the alkaline earth metal retarders taught herein are particularly useful as retarders in thixotropic cement slurries of the type comprising a hydraulic cement, water, and effective amounts of iron (II) sulfate or a hydrate thereof and aluminum sulfate or a hydrate thereof to render the slurry thixotropic. For example, calcium glucoheptonate was found to not only retard the set rate of such a slurry, but to do so without destroying the thixotropic property and/or lignin compounds of the slurry. In contrast, sodium glucoheptonate destroyed the thixotropy of the slurry.

EXAMPLES AND COMPARISON RUNS

The practice of the present invention and its unexpected advantages over the prior art—most notably the art employing sodium glucoheptonate as a retarder—are further illustrated by the examples and comparison runs which follow.

In the tests, the procedures followed for the various tests were substantially those specified in API RP10B (19th Ed., 1974) with slight deviations in the schedules, i.e., unless otherwise specified, a 1.5° F./100 ft temperature gradient was used throughout in bringing the slurry to the stated temperature.

Series One

To demonstrate the effect of various compounds on the fluid loss of a slurry of the type containing a polyamino fluid loss additive, the fluid loss of a series of slurries was tested. Each slurry contained, by weight, 100 parts Portland cement, 43 parts fresh water, 1 part polyethyleneimine added as a 33 weight percent solution, and 0.5 parts polynaphthalene sulfonate dispersant added as a 40 weight percent aqueous solution, together with various additives as indicated in Table 1. The water and additives were agitated in a Waring blendor at low speed as the cement was added over a 15–20 second time span. The blendor was then operated at high speed for 35 seconds. Finally, the slurry was mixed for 20 minutes at 190° F. in an atmospheric consistometer. Unless otherwise indicated, fluid loss was determined at 190° F. and 1000 psi. All values are corrected to a 4-inch screen and 30 minutes.

TABLE 1
FLUID LOSS DATA

| Test No. | Cement | Composition of Retarder Solution grams solid/100 ml. of solution | Ml. of Retarder Solution used per 100 g of cement | Fluid loss corrected to 30 min. |
| --- | --- | --- | --- | --- |
| CR-1 | Okla H | 25 NaGH | 0.4 | 1350 |
| CR-2 | Okla H | 25 NaGH | 1.6 | 1400 |
| CR-3 | Lou H | 25 NaGH | 2.0 | 1210 |
| CR-4 | Lou H | 0.1% BWOC solid NaGH added directly to mix water | | 1140 |
| CR-5 | Okla H | 15 NaGH, 5 zinc borate | 2.0 | 1060 |
| CR-6 | Lou H | 25 NaGH, 5 $ZnCl_2$ | 2.0 | 890 |
| CR-7 | Lou H | 25 NaGH, 10 $ZnCl_2$ | 2.0 | 980 |
| CR-8 | Lou H | 25 NaGH, 15 KCl | 1.0 | 1280 |
| CR-9 | Lou H | 25 NaBGH | 2.0 | 1175 |
| CR-10 | Lou H | 25 NaGH, 9.5 borax | 2.0 | 1280 |
| CR-11 | Lou H | 25 NaGH, 9.5 borax, 15 $ZnCl_2$ | 2.0 | 1290 |
| Ex-1 | Okla H | 25 NaGH, 7 Dowflake | 2.0 | 24 |
| Ex-2 | Lou H | 25 NaGH, 7 Dowflake | 2.0 | 29 |
| Ex-3 | LnStr H (NO) | 25 NaGH, 7 Dowflake | 2.0 | 27 |
| Ex-4 | LnStr H (Hou) | 25 NaGH, 7 Dowflake | 2.0 | 27 |
| Ex-5 | Lou H | 25 NaGH, 5 Dowflake | 0.5 | 254 |
| Ex-6 | Lou H | 25 NaGH, 7 Dowflake | 0.5 | 144 |
| Ex-7 | Lou H | 25 NaGH, 14 Dowflake | 0.5 | 46 |
| Ex-8 | Lou H | 25 NaGH, 21 Dowflake | 0.5 | 38 |
| Ex-9 | Lou H | 25 NaGH, 40 Dowflake | 0.5 | 76 |
| Ex-10 | Unabase H | 25 NaGH, 7 Dowflake | 0.5 | 62 |
| Ex-11 | LnStr H (NO) | 25 NaGH, 7 Dowflake | 0.5 | 44 |
| Ex-12 | LnStr H (Mary) | 25 NaGH, 7 Dowflake | 0.5 | 212 |
| Ex-13 | Perm G | 25 NaGH, 7 Dowflake | 0.5 | 128 |
| Ex-14 | Lou H | 25 NaGH, 5 Dowflake | 1.0 | 320 |
| Ex-15 | Lou H | 25 NaGH, 7 Dowflake | 1.0 | 26 |
| Ex-16 | Lou H | 25 NaGH, 10 Dowflake | 1.0 | 28 |
| Ex-17 | Lou H | 25 NaGH, 14 Dowflake | 1.0 | 36 |
| Ex-18 | Lou H | 25 NaGH, 18 Dowflake | 1.0 | 60 |
| Ex-19 | Lou H | 25 NaGH, 25 Dowflake | 1.0 | 121 |
| Ex-20 | Lou H | 25 NaGH, 10 $MgCl_2 . 6H_2O$ | 1.0 | 46 |
| Ex-21 | Lou H | 25 NaGH, 10 $MgCl_2 . 6H_2O$ | 2.0 | 56 |
| Ex-22 | Lou H | 25 NaGH, 10 Ca acetate | 2.0 | 92 |
| Ex-23 | Lou H | 25 NaGH, 12 $Ca(NO_3)_2 . 4H_2O$ | 2.0 | 88 |
| Ex-24 | Lou H | 25 NaGH, 13 $SrCl_2 . 6H_2O$ | 1.0 | 18 |
| Ex-25 | Lou H | 25 NaGH, 12 $BaCl_2 . 2H_2O$ | 1.0 | 16 |
| Ex-26 | Lou H | 25 CaGH | 1.0 | 29 |
| Ex-27 | Lou H | 5 Ca Gluconate | 10.0 | 28 |
| Ex-28 | Lou H | 1 Ca Mucate | 30.0 | 32 |
| Ex-29 | Lou H | 25 NaGH, 7 Dowflake | 4.0 | 56 (at 325° F.) |
| Ex-30 | Lou H | 25 NaGH, 9.5 borax, 14 Dowflake | 2.0 | 72 |
| Ex-31 | Lou H | 25 NaGH, 9.5 borax, 10 Dowflake | 2.0 | 390 |
| Ex-32 | Lou H | 25 NaGH, 9.5 borax, 18 Dowflake | 2.0 | 87 |
| Ex-33 | Lou H | 25 NaGH, 6.1 boric acid 3.7 $Ca(OH)_2$, 7 Dowflake | 2.0 | 76 |
| Ex-34 | Lou H | 25 NaGH, 3.1 boric acid, 1.9 $Ca(OH)_2$, 7 Dowflake | 2.0 | 37 |
| Ex-35 | Lou H | 25 NaGH, 4.6 boric acid, 2.8 $Ca(OH)_2$, 7 Dowflake | 2.0 | 46 |
| Ex-36 | Lou H | 25 NaGH, 5.4 boric acid, 3.3 $Ca(OH)_2$, 7 Dowflake | 2.0 | 56 |
| Ex-37 | LnStr H | 25 NaGH, 6.1 boric acid, | 1.0 | 135 |

TABLE 1-continued

FLUID LOSS DATA

| Test No. | Cement | Composition of Retarder Solution grams solid/100 ml. of solution | Ml. of Retarder Solution used per 100 g of cement | Fluid loss corrected to 30 min. |
|---|---|---|---|---|
| Ex-38 | Lou H | 25 NaGH, 6.1 boric acid, 3.3 Ca(OH)$_2$, 7 Dowflake 3.3 Ca(OH)$_2$, 8 Ca acetate | 2.0 | 220 |
| Ex-39 | Lou H | 25 NaGH, 9.5 borax, 20 MgCl$_2$ . 2H$_2$O | 1.0 | 144 |
| Ex-40 | Lou H | 25 NaGH, 9.5 borax, 27 SrCl$_2$ . 6H$_2$O | 1.0 | 24 |
| Ex-41 | Lou H | 25 NaGH, 9.5 borax, 40 SrCl$_2$ . 6H$_2$O | 1.0 | 38 |
| Ex-42 | Lou H | 25 NaGH, 9.5 borax, 23 BaCl$_2$ . 2H$_2$O | 1.0 | 28 |
| Ex-43 | Lou H | 25 NaGH, 9.5 borax, 15 Dowflake | 1.0 | 64 |
| Ex-44 | Lou H | 25 Ca boroglucoheptonate | 1.0 | 130 |

Notes:
CR = comparison run
EX = example of the invention
CaGH = calcium glucoheptonate
NaGH = sodium glucoheptonate
Dowflake = Dowflake brand calcium chloride, nominally CaCl$_2$ . 2H$_2$O; assay 77–80% CaCl$_2$
Okla = *Oklahoma Class H cement*
Lou H = *Louisiana Class H cement*
LnStr H (Hou) = *Lone Star Class H, Houston, Tx.*
LnStr H (Mary) = *Lone Star Class H, Maryneal, Tx.*
LnStr H (NO) = *Lone Star Class H, New Orleans, La.*
Perm G = *Kaiser Class G, Permanente, Ca.*
NaBGH = *sodium boroglucoheptonate*

The data in Table 1 clearly show that acceptable fluid loss—i.e., less than about 400 ml/30 min, preferably less than 100 ml/30 min and most preferably less than 35 ml/30 min—can be obtained using an effective amount of the alkaline earth metal salt form of the sugar acid or borate ester thereof, whereas virtually no fluid loss control was provided using the corresponding sodium form, or even other divalent metal salts, e.g., the zinc salt.

Series Two

The thickening times and compressive strengths of various compositions were tested. All slurries were mixed with sufficient water to provide a total of 46 percent water BWOC, including the water in the retarder concentrate. Results are shown in Table 2. In the Compressive Strength column, a blank indicates the test was not run, and "IS" indicates the slurry had achieved an initial set but did not have appreciable compressive strength. Other abbreviations in Table 2 are explained in the Notes following Table 1. Thickening times were run substantially in accord with Schedule 31 of Supplement 1 (Feb. 1975) to API Bulletin RP10B, except modified to 300° F. Schedules 7S and 8S were modified to 250° F. and to 300° F. for the compressive strength tests.

TABLE 2

THICKENING TIME AND COMPRESSIVE STRENGTH DATA

| Test No. | Cement | Retarder Solution grams solids/100 ml of soln. | Ml Retarder Soln. Used per 100 g cement | Temp °F. | Thickening Time Hours:Min | 24-hour Compressive Strength p.s.i. |
|---|---|---|---|---|---|---|
| CR-12 | Lou H | 25 NaGH | 3.2 | 300 | 4:18 | IS |
| CR-13 | Lou H | 25 NaGH | 0.8 | 250 | 4:35 | IS |
| Ex-45 | Lou H | 25 NaGH, 7 Dowflake | 3.2 | 300 | 3:12 | 3600 |
| Ex-46 | Lou H | 25 NaGH, 7 Dowflake | 3.4 | 300 | 4:45 | IS |
| Ex-47 | Lou H | 25 purified Ca glucoheptonate | 3.6 | 300 | 4:48 | — |
| Ex-48 | Lou H | 25 purified Ca glucoheptonate | 4.0 | 300 | 6:36 | — |
| Ex-49 | Lou H | 25 NaGH, 7 Dowflake | 0.8 | 250 | 4:45 | 4285 |
| Ex-50 | Lou H | 25 NaGH, 7 Dowflake | 0.6 | 250 | 2:40 | — |
| Ex-51 | Lou H | 25 NaGH, 7 Dowflake | 1.0 | 250 | 6:28 | — |
| Ex-52 | Lou H | 25 NaGH, 7 Dowflake (Sea water used as mix water in Ex-52) | 0.8 | 250 | 3:40 | 5075 |
| Ex-53 | Lou H | 25 NaGH, 13 SrCl$_2$ . 6H$_2$O | 0.8 | 250 | 4:25 | 3371 |
| CR-14 | Okla H | 25 NaGH, 12 borax | 0.8 | 300 | 4:08 | 5230 |
| CR-15 | Okla H | 25 NaBGH | 1.2 | 300 | 4:01 | 4265 |
| Ex-54 | Okla H | 25 NaGH, 5 boric acid, 10 Sr(NO$_3$)$_2$ | 0.8 | 300 | 2:57 | 4383 |
| Ex-55 | Okla H | 25 NaGH, 5 boric acid, 10 Sr(NO$_3$)$_2$ | 1.0 | 300 | 3:45 | 3922 |
| Ex-56 | Lou H | 25 NaGH, 9.5 borax, 14 Dowflake | 3.0 | 300 | 2:34 | — |
| Ex-57 | Lou H | 25 NaGH, 9.5 borax, 14 Dowflake | 3.5 | 300 | 3:48 | 6100 |
| Ex-58 | Lou H | 25 NaGH, 9.5 borax, 14 Dowflake | 3.75 | 300 | 4:46 | 4350 |
| Ex-59 | Lou H | 25 NaGH, 6.1 boric acid, 3.7 Ca(OH)$_2$, 7 Dowflake | 0.8 | 250 | 3:58 | 3590 |
| Ex-60 | Lou H | 25 NaGH, 6.1 boric acid, 3.7 Ca(OH)$_2$, 7 Dowflake (Sea water used as mix water in Ex-60) | 0.8 | 250 | 4:50 | 150 |
| Ex-61 | Lou H | 25 Ca borogluconate | 1.5 | 250 | 3:12 | — |
| Ex-62 | Lou H | 25 NaGH, 9.5 borax, | 3.5 | 300 | 5:28 | 4290 |

TABLE 2-continued
THICKENING TIME AND COMPRESSIVE STRENGTH DATA

| Test No. | Cement | Retarder Solution grams solids/100 ml of soln. | M1 Retarder Soln. Used per 100 g cement | Temp °F. | Thickening Time Hours:Min | 24-hour Compressive Strength p.s.i. |
|---|---|---|---|---|---|---|
| Ex-63 | Lou H | 26 SrCl$_2$ . 6H$_2$O 25 NaGH, 9.5 borax, 26 SrCl$_2$ . 6H$_2$O | 0.7 | 250 | 4:17 | 3768 |
| Ex-64 | Lou H | 25 NaGH, 9.5 borax, 23 BaCl$_2$ . 6H$_2$O | 3.5 | 300 | 3:37 | — |
| Ex-65* | Lou H | 25 NaGH, 7 Dowflake | 3.0 | 300 | 3:35 | 4170 |
| Ex-66* | Lou H | 25 NaGH, 7 Dowflake | 3.3 | 300 | 4:44 | 2740 |

*Exs-65 and 66 contained 1% BWOC polyethyleneimine added as a 33% aqueous solution and 0.5% BWOC polynaphthalene sulfonate dispersant added as a 40% aqueous solution. The 30 minute fluid loss of Ex-65 at 300° F. was 64 ml.

Series Three

A retarder concentrate according to the present invention was prepared containing, per 100 gallons of concentrate:
 about 65 gallons water;
 416.5 lbs sodium glucoheptonate;
 116 lbs Dowflake brand calcium chloride dihydrate;
 0.4 oz Adomall bactericide (about 23.6% C$_8$-C$_{18}$ bis(2-hydroxyethyl) benzyl ammonium chloride, 2.7% N-polyethylene polyamine N-oleylamine hydrochloride, 30% isopropanol and 43.7% inert); and
 0.4 oz Fluorescein dye.

Series Four

A liquid concentrate was prepared by dissolving 32.8 parts by weight of Al$_2$(SO$_4$)$_3$.18H$_2$O, 4.5 parts of FeSO$_4$.7H$_2$O and 3 parts of H$_2$SO$_4$ in 59.7 parts of water. Two slurries were prepared, one using sea water as the mix water and the other using fresh water. Each was prepared by admixing with a shear blender, 100 parts Class G cement with a mixture of 70 parts mix water, about 8.95 parts of the liquid concentrate described in the first sentence of this paragraph, and about 0.23 parts of the retarder concentrate described in Series Three. These proportions were equivalent to 70 percent mix water, 0.8 gal of the thixotropic additive solution/94 lb sack of cement, and 0.02 gal of the retarder additive concentrate/94 lb sack of cement. In each case, the cement dispersed easily and formed a uniform aqueous cement slurry in the container. After mixing was complete, each slurry was allowed to remain stationary for a period of from about four to five minutes. The slurry formed a self-supporting gel at the end of this time, as demonstrated by turning the container upside down and observing that the slurry remained in the container. The gelled aqueous cement slurry, however, was easily broken by agitation with a stirring rod or by shaking the container and when broken poured easily from the container. A gel reformed within one minute after agitation of the slurry ceased. The preparation of the cement slurry was done according to API Procedure RP10B. The compressive strengths of the cement slurries were measured by following API Bulletin RP10B Section 6, Schedule 3S. The data from these tests are shown below in Table 4A:

TABLE 4A
COMPRESSIVE STRENGTH, SCHEDULE 3S

| Test No. | Mix Water | 8 hr psi | 24 hr psi | 3 days psi | 7 days psi |
|---|---|---|---|---|---|
| Ex-65 | Fresh | 470 | 1320 | 1990 | 2430 |

TABLE 4A-continued
COMPRESSIVE STRENGTH, SCHEDULE 3S

| Test No. | Mix Water | 8 hr psi | 24 hr psi | 3 days psi | 7 days psi |
|---|---|---|---|---|---|
| Ex-66 | Sea | 550 | 1590 | 1890 | 2500 |

Tests were also run using Schedule 9S on slurries containing the retarder concentrate in an amount of 0.04 gal/sack. Results are shown in Table 4B.

TABLE 4B
COMPRESSIVE STRENGTH, SCHEDULE 9S

| Test No. | Mix Water | 8 hr psi | 24 hr psi | 3 days psi | 7 days psi |
|---|---|---|---|---|---|
| Ex-67 | Fresh | 675 | 760 | 650 | 400 |
| Ex-68 | Sea | 10 | 955 | 1575 | 1500 |

In a comparison run, wherein sodium glucoheptonate alone was used as a retarder, the resulting slurries were not thixotropic.

What is claimed is:

1. A hydraulic cement slurry comprising a hydraulic cement, sufficient water to form a pumpable slurry which will cure to a dimensionally stable solid, and an effective amount of a retarder selected from the group consisting of
 alkaline earth metal salts of mono- and di-carboxylic acid derivatives of simple sugars,
 said slurry being substantially free of lignin derivatives.

2. The slurry of claim 1 wherein the retarder is a calcium, strontium, or barium salt of glucoheptonic acid or a mixture thereof.

3. A hydraulic cement slurry comprising a hydraulic cement; a polyamino fluid loss additive selected from the group consisting of polyalkyleneimines, polyalkylenepolyamines and mixtures thereof; a dispersant; water; and dissolved in the water, a retarder selected from the group consisting of (a) alkaline earth metal salts of mono- and di-carboxylic acid derivatives of simple sugars, and (b) alkaline earth metal salts of borate esters of mono- and di-carboxylic acid derivatives of simple sugars, and (c) mixtures of any of the foregoing.

4. The composition of claim 3 wherein the alkaline earth metal retarder compound is selected from those members of the class which are soluble in water in an amount of at least 10 percent by weight at 20° C.

5. The composition of claim 3 wherein the alkaline earth metal retarder compound is selected from those members of the class which are soluble in water in an amount sufficient to lower the freezing point of a retarder-water solution to −6.7° C. (20° F.).

6. The composition of claim 3 wherein the alkaline earth metal is calcium, strontium, or barium.

7. The composition of claim 6 wherein the alkaline earth metal is calcium.

8. The composition of claim 3 wherein the retarder is an alkaline earth metal salt of a mono- or di-carboxylic acid of a $C_5$–$C_7$ simple sugar.

9. The composition of claim 8 wherein the retarder is an alkaline earth metal salt of glucoheptonic acid.

10. The composition of claim 9 wherein the retarder is calcium, strontium, or barium glucoheptonate.

11. The composition of claim 10 wherein the retarder is prepared by adding to water: glucoheptonic acid or sodium glucoheptonate, and calcium, strontium, or barium chloride.

12. The composition of claim 10 comprising
    (a) Portland cement, and by weight of neat cement:
    (b) from about 35 to about 55 percent water;
    (c) from about 0.1 to about 5 percent a polyamino compound;
    (d) from about 0.1 to about 2.5 percent polynaphthalene sulfonate; and
    (e) from about 0.2 to about 0.6 percent calcium glucoheptonate.

13. A dimensionally stable solid formed by curing the composition of any one of claims 1–12.

14. A method of cementing a conduit in a bore-hole penetrating a subterranean formation, comprising preparing the slurry of any one of claims 1–12, and emplacing said slurry in at least a portion of the annulus defined by the exterior of the conduit and the wall of the borehole.

15. A method of plugging a void in a subterranean formation comprising injecting the slurry of any one of claims 1–12 into said void and permitting the slurry to cure to a dimensionally stable solid therein.

16. A method for cementing a well comprising:
    providing a concentrated aqueous solution comprising at least one water soluble fluid loss additive;
    providing a concentrated aqueous solution comprising at least one water soluble retarder;
    providing a source of mix water;
    adding an effective amount of each of the concentrates to the mix water;
    pumping said mix water with said concentrates added thereto through a conduit connected to the well and having means for continuously admixing a dry particulate with the mix water;
    continuously adding an effective amount of dry particulate hydraulic cement to the mix water via said means in said conduit to form a pumpable cement slurry which will cure after emplacement adjacent a preselected zone in the well, and
    injecting the pumpable slurry into the well to a point adjacent the preselected zone, said slurry being further characterized as consisting of water and water-soluble components only, with the exception of the neat cement, and being substantially free of lignin derivatives.

17. The method of claim 16 wherein a continuous flow of mix water is provided and the liquid concentrates are continuously metered into the mix water.

* * * * *